(12) United States Patent
Kim et al.

(10) Patent No.: US 9,376,948 B2
(45) Date of Patent: Jun. 28, 2016

(54) VEHICLE AND METHOD OF TREATING AN EXHAUST GAS

(71) Applicant: GM GLOBAL TECHNOLOGY OPERATIONS LLC, Detroit, MI (US)

(72) Inventors: Chang H. Kim, Rochester, MI (US); Steven J. Schmieg, Troy, MI (US); Eugene V. Gonze, Pinckney, MI (US); Michael J. Paratore, Jr., Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 159 days.

(21) Appl. No.: 13/929,899

(22) Filed: Jun. 28, 2013

(65) Prior Publication Data

US 2015/0000253 A1 Jan. 1, 2015

(51) Int. Cl.
*F01N 3/10* (2006.01)
*F01N 3/08* (2006.01)
(Continued)

(52) U.S. Cl.
CPC .............. *F01N 3/0814* (2013.01); *F01N 3/106* (2013.01); *F01N 3/2006* (2013.01); *F01N 3/2066* (2013.01); *F01N 3/2882* (2013.01);
(Continued)

(58) Field of Classification Search
CPC ..... F01N 13/009; F01N 3/106; F01N 3/2006; F01N 3/2066; F01N 9/00; F01N 2240/28; F01N 2900/1404; F01N 3/035; Y02T 10/24; Y02T 10/26; Y02T 10/47
See application file for complete search history.

(56) References Cited

U.S. PATENT DOCUMENTS 7,431,895 B2 * 10/2008 Pfeifer et al. ................. 422/177
7,814,744 B2   10/2010 Mital
(Continued)

FOREIGN PATENT DOCUMENTS

FR    2970298 A1   7/2012
JP    2004181418 A  7/2004
WO    2008047170 A1  4/2008

OTHER PUBLICATIONS

Leray, A, Khaced, A, Makarov, M, and Cormier, J. "Diesel Oxidation Catalyst Combined to Non-Thermal Plasma: Effect on Activation Catalyst Temperature and byproducts formation". 20$^{th}$ Internatinal Symposium on Plasma Chemistry, Ju 2001, Philadelphia, United States. pp. 1-4 <hal-00680790v2>.*
(Continued)

*Primary Examiner* — Thomas Denion
*Assistant Examiner* — Brandon Lee
(74) *Attorney, Agent, or Firm* — Quinn Law Group, PLLC

(57) ABSTRACT

A method of treating an exhaust gas produced by a vehicle internal combustion engine includes conveying the gas through a first reactor including a non-thermal plasma. The gas includes nitric oxide and is transitionable between a first condition in which the gas has a cold-start temperature that is less than or equal to about 150° C., and a second condition in which the gas has an operating temperature that is greater than about 150° C. During the first condition, the method includes contacting the gas and plasma to oxidize the nitric oxide to nitrogen dioxide and form an effluent that includes nitrogen dioxide. The method includes concurrently conveying the effluent through a second reactor including a diesel oxidation catalyst, and storing the nitrogen dioxide within the second reactor during only the first condition. The method includes, after storing, releasing nitrogen dioxide from the second reactor during only the second condition.

20 Claims, 2 Drawing Sheets

(51) Int. Cl.
    *F01N 3/20*      (2006.01)
    *F01N 3/28*      (2006.01)
    *F01N 9/00*      (2006.01)
    *F01N 13/00*     (2010.01)
    *F01N 3/035*     (2006.01)

(52) U.S. Cl.
    CPC ............ *F01N 9/00* (2013.01); *F01N 13/0097* (2014.06); *F01N 3/035* (2013.01); *F01N 2240/28* (2013.01); *F01N 2370/04* (2013.01); *F01N 2900/1404* (2013.01); *Y02T 10/24* (2013.01); *Y02T 10/26* (2013.01); *Y02T 10/47* (2013.01)

(56) References Cited

U.S. PATENT DOCUMENTS

2009/0173064 A1* 7/2009 Ren et al. ........................ 60/299
2010/0293926 A1 11/2010 Perry et al.
2012/0210696 A1 8/2012 Schmieg et al.
2013/0294989 A1 11/2013 Koch et al.

OTHER PUBLICATIONS

John W. Hoard, Steven J. Schmieg, David J. Brooks, Charles H.F. Peden, Stephan E. Barlow, Russell G. Tonkyn; "Dynamometer Evaluation of Plasma-Catalyst for Diesel NOx Reduction"; DEER 2003; Aug. 28, 2003.

Steven J. Schmieg, Byong K. Cho, Se H. Oh; "Hydrocarbon Reactivity in a Plasma-Catalyst System: Thermal Versus Plasma-Assisted Lean NOx Reduction"; Society of Automotive Engineers, Inc.; 2001; 2001-01-3565.

B.M. Penetrante, R.M. Brusasco, B.T. Merritt, W.J. Pitz, G.E. Vogtlin, M.C. Kung, H.H. Kung, C.Z. Wan, K.E. Voss; Plasma-Assisted Catalytic Reduction of NOx; SAE Technical Paper Series; Oct. 19-22, 1998; pp. 1-9; 982508.

Yucong Wang, Shankar Raman, Jessy W. Grizzle; "Dynamic Modeling of a Lean NOx Trap for Lean Burn Engine Control"; American Control Conference—ACC, 1999, vol. 2, pp. 1208-1212.

* cited by examiner

VEHICLE AND METHOD OF TREATING AN EXHAUST GAS

TECHNICAL FIELD

The present disclosure relates to methods of treating an exhaust gas produced by a vehicle internal combustion engine.

BACKGROUND

Internal combustion engines, such as diesel engines, gasoline-fueled engines, and other lean-burn engines, may be operated at higher than stoichiometric air-to-fuel mass ratios. Such engines generally include several pistons, each disposed within a respective cylinder, into which air and fuel are sequentially introduced for combustion. Combustion produces an exhaust gas which may be continually expelled from the internal combustion engine through an exhaust manifold to an exhaust conduit for eventual discharge to the ambient environment.

Because such engines may be operated at higher than stoichiometric air-to-fuel mass ratios, the resulting exhaust gas may include a comparatively higher quantity of oxygen, water, and nitrogen oxides ($NO_x$), e.g., nitric oxide (NO) and/or nitrogen dioxide ($NO_2$), than the exhaust gas of an internal combustion engine operated at another air-to-fuel mass ratio.

SUMMARY

A method of treating an exhaust gas produced by a vehicle internal combustion engine includes conveying the exhaust gas through a first reactor. The first reactor includes a non-thermal plasma and is disposed adjacent to and in fluid communication with the vehicle internal combustion engine. The exhaust gas includes nitric oxide and is transitionable between a first condition in which the exhaust gas has a cold-start temperature that is less than or equal to about 150° C., and a second condition in which the exhaust gas has an operating temperature that is greater than about 150° C. During the first condition, the method includes contacting the exhaust gas and the non-thermal plasma to thereby oxidize the nitric oxide to nitrogen dioxide and form a first effluent gas that includes nitrogen dioxide. The method also includes conveying the first effluent gas through a second reactor. The second reactor includes a diesel oxidation catalyst and is disposed adjacent to and in fluid communication with the first reactor. Concurrent to conveying, the method includes storing the nitrogen dioxide within the second reactor during only the first condition. Further, the method includes, after storing, releasing the nitrogen dioxide from the second reactor during only the second condition.

In one embodiment, the method includes, contacting the first effluent gas and the diesel oxidation catalyst to thereby form an intermediate effluent gas. The method also includes conveying the intermediate effluent gas through a third reactor. The third reactor includes a selective catalytic reduction catalyst and is disposed adjacent to and in fluid communication with the second reactor. Further, concurrent to conveying the intermediate effluent gas, the method includes storing the nitrogen dioxide within the third reactor during only the first condition. After storing the nitrogen dioxide within the second reactor and the third reactor, the method includes releasing the nitrogen dioxide from the second reactor and the third reactor during only the second condition. Further, the method includes reducing the nitric oxide and nitrogen dioxide to nitrogen gas, and discharging the nitrogen gas from the vehicle internal combustion engine.

A vehicle includes an internal combustion engine configured for producing the exhaust gas during operation. The vehicle also includes the first reactor disposed adjacent to and in fluid communication with the internal combustion engine. The first reactor includes the non-thermal plasma and is configured for oxidizing the nitric oxide to nitrogen dioxide during only the first condition. The vehicle further includes a first effluent gas that is substantially free from nitric oxide, includes nitrogen dioxide, and is conveyable from the first reactor during the first condition. The vehicle also includes a warmed exhaust gas that includes nitric oxide, is substantially free from nitrogen dioxide, and is conveyable from the first reactor during the second condition. In addition, the vehicle includes the second reactor disposed adjacent to and in fluid communication with the first reactor. The second reactor includes a diesel oxidation catalyst and is configured for oxidizing the nitric oxide to nitrogen dioxide during only the second condition. The vehicle also includes nitrogen dioxide stored within the second reactor during only the first condition.

The above features and advantages and other features and advantages of the present invention will be readily apparent from the following detailed description of the preferred embodiments and best modes for carrying out the present invention when taken in connection with the accompanying drawings and appended claims.

DETAILED DESCRIPTION

Figure 1:
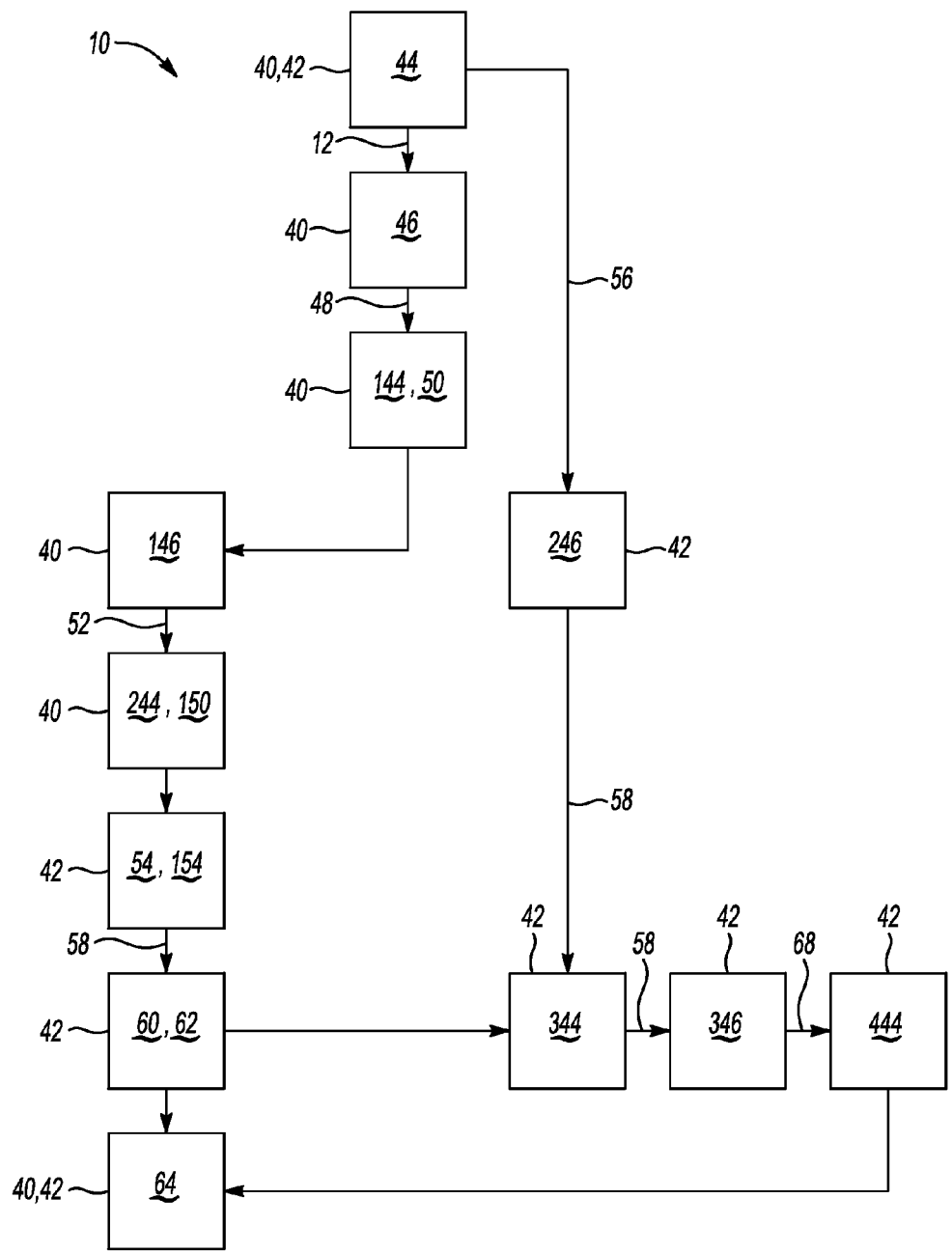
FIG. 1 is a flowchart of a method of treating an exhaust gas produced by a vehicle internal combustion engine.
Figure 2:
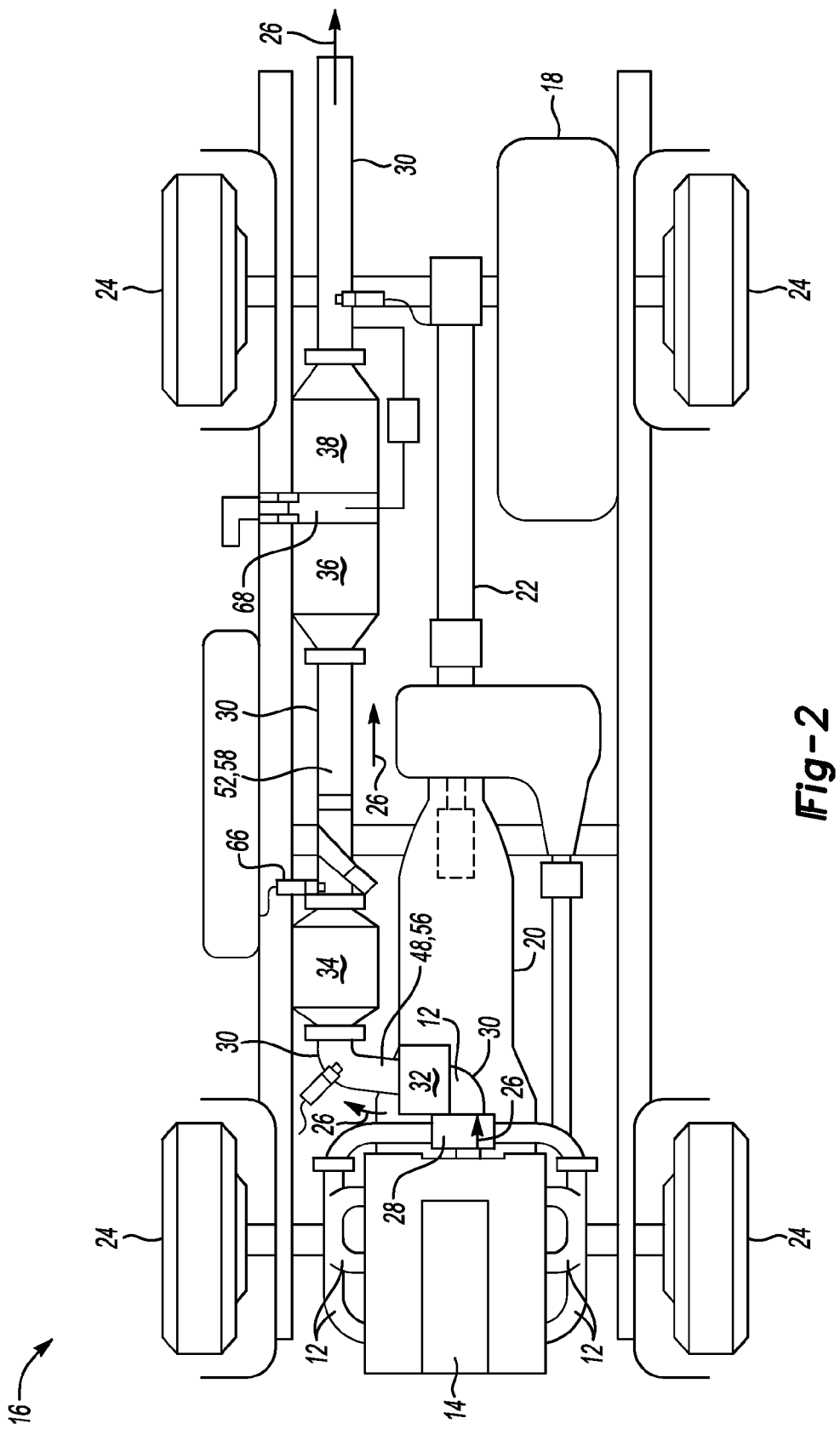
FIG. 2 is a schematic illustration of a plan view of a vehicle operable to produce the exhaust gas for the method of FIG. 1.

Referring to the Figures, wherein like reference numerals refer to like elements, a method 10 of treating an exhaust gas 12 produced by a vehicle internal combustion engine 14 (FIG. 2) is shown generally in FIG. 1, and a vehicle 16 operable to produce the exhaust gas 12 is shown generally in FIG. 2. The method 10 may be useful for vehicles 16 including an internal combustion engine 14 operable at greater than stoichiometric air-to-fuel mass ratios, i.e., operable with air-to-fuel mixtures which include comparatively more air than fuel, such as compression ignition direct injection engines, diesel engines, and other lean-burn engines. The method 10 may be particularly useful for such internal combustion engines 14 after a cold-start of the internal combustion engine 14, i.e., when the internal combustion engine 14 has not been operating prior to starting the internal combustion engine 14, and/or when an operating temperature of the exhaust gas 12 is less than about 150° C.

Referring to FIG. 2, the vehicle internal combustion engine 14 may produce the exhaust gas 12 during combustion. For example, the vehicle 16 may be a diesel-engine powered light-duty pickup truck and/or may be classified as a super ultra low emission vehicle (SULEV). During operation, the internal combustion engine 14 may be supplied with diesel fuel stored in a fuel tank 18, and may transmit power through a transmission 20 and driveshaft 22 to one or more wheels 24 of the vehicle 16. In particular, the internal combustion engine 14 may include a plurality of pistons (not shown) each configured for reciprocating within a respective cylinder (not shown) during combustion of a mixture of air and fuel within each respective cylinder. The exhaust gas 12 may be a byproduct of such combustion, and the exhaust gas 12 may flow in the direction of arrow 26 from an exhaust manifold 28 into an exhaust conduit 30 for treatment and eventual discharge into the ambient environment external to the vehicle 16. That is, the exhaust gas 12 leaving the exhaust manifold 28 of the internal combustion engine 14 may be conveyed or conducted through the exhaust conduit 30 and through one or more reactors 32, 34, 36 and/or filters 38 before being released from a final section of the exhaust conduit 30 to the atmosphere.

Referring again to FIG. 2, the exhaust gas 12 may exit the exhaust manifold 28 of the internal combustion engine 14. A composition of the exhaust gas 12 may be a function of the type of compression-ignitable fuel, e.g., diesel fuel, an air-to-fuel mass ratio, e.g., about 17:1, and a combustion efficiency of the mixture of air and fuel within each cylinder of the internal combustion engine 14. In general, the exhaust gas 12 may include a mixture of carbon monoxide, carbon dioxide, incompletely burned hydrocarbons, oxygen, water, nitrogen, and nitrogen oxides ($NO_x$) such as nitric oxide (NO) and nitrogen dioxide ($NO_2$). A representative composition of the exhaust gas 12 may include about 10 parts by volume oxygen, about 6 parts by volume carbon dioxide, about 5 parts by volume water, about 0.1 part by volume carbon monoxide, about 180 parts per million by volume hydrocarbons, about 235 parts per million by volume nitrogen oxides ($NO_x$), and the balance nitrogen based on 100 parts by volume of the exhaust gas 12. In addition, the exhaust gas 12 may include a plurality of carbon-rich particles and/or sulfur dioxide.

Therefore, with continued reference to FIG. 2, during operation of the internal combustion engine 14, the exhaust gas 12 may include nitric oxide (NO) and may be transitionable between a first condition (shown generally at 40 in FIG. 1) in which the exhaust gas 12 has a cold-start temperature that is less than or equal to about 150° C., and a second condition (shown generally at 42 in FIG. 1) in which the exhaust gas 12 has an operating temperature that is greater than about 150° C. For example, upon initial start-up of the internal combustion engine 14, the exhaust gas 12 may be comparatively cooler than the operating temperature of the exhaust gas 12 after the internal combustion engine 14 has been operating for, for example, about 500 seconds. Conversely, after the internal combustion engine 14 has been operating after an initial warm-up period, the operating temperature may be greater than or equal to about 150° C., e.g., from about 150° C. to about 600° C. Also, components of the vehicle 16 disposed comparatively closer to the internal combustion engine 14 along the exhaust conduit 30 may warm from the cold-start temperature to the operating temperature faster than components of the vehicle 16 disposed comparatively farther from the internal combustion engine 14 along the exhaust conduit 30.

Referring now to FIG. 1, the method 10 includes conveying 44 the exhaust gas 12 through a first reactor 32 (FIG. 2). The first reactor 32 includes a non-thermal plasma and is disposed adjacent to and in fluid communication with the vehicle internal combustion engine 14 (FIG. 2). That is, as best shown in FIG. 2 and as described with reference to the flow of exhaust gas 12 in the direction of arrow 26, the first reactor 32 may be disposed downstream of the vehicle internal combustion engine 14, and may be disposed directly adjacent to the internal combustion engine 14. For example, the first reactor 32 may be spaced apart from the exhaust manifold 28 of the internal combustion engine 14 by from about 5 cm to about 50 cm, and the exhaust gas 12 may be conveyed directly from the exhaust manifold 28 of the internal combustion engine 14, through the exhaust conduit 30, to the first reactor 32 during operation of the internal combustion engine 14.

The first reactor 32 (FIG. 2) includes the non-thermal plasma and is configured for oxidizing the nitric oxide (NO) of the exhaust gas 12 to nitrogen dioxide ($NO_2$) during only the first condition 40 (FIG. 1), as set forth in more detail below. That is, the first reactor 32 may treat or condition the exhaust gas 12 when the exhaust gas 12 has a cold-start temperature of less than or equal to about 150° C., or until the exhaust gas 12 has warmed to the operating temperature. As used herein, the terminology "non-thermal plasma" refers to a plasma which is not in thermodynamic equilibrium. The non-thermal plasma may include a mixture of free radicals, ions, and electrons that may cause the ionization of the exhaust gas 12 as the exhaust gas 12 is conveyed through the first reactor 32.

The first reactor 32 may be any non-thermal plasma reactor, such as a glow discharge reactor, radio frequency discharge reactor, pulsed corona reactor, dielectric-barrier discharge reactor, electrified packed bed reactor, surface discharge reactor, and the like. During the first condition 40 (FIG. 1), the first reactor 32 may be connected to a power supply and may generate the non-thermal plasma. The non-thermal plasma may be generated by, for example, electrical fields, electron beams, irradiation with electromagnetic energy, and the like. In one non-limiting embodiment, the non-thermal plasma of the first reactor 32 may be generated by an electrical field. For example, the non-thermal plasma may be generated by a high voltage electrical field, e.g., about 20 kilovolts per centimeter, that approaches a breakdown voltage for the exhaust gas 12.

In another example, the first reactor 32 may be a corona discharge reactor, and the electrical field may be non-uniform. For example, a small wire (not shown) may be disposed along a length of the first reactor 32, and the electrical field may be strong at the wire, fall off rapidly with increasing distance from the wire, and extinguish before reaching a wall of the first reactor 32.

In yet another example, the first reactor 32 may be a packed bed reactor, and a volume between electrodes of the packed bed reactor may be packed with a dielectric material, such as beads. As such, the electrical field may be concentrated at the dielectric material based on a difference in dielectric constants of the dielectric material and the exhaust gas 12. The dielectric material may be, for example, zirconia, alumina, titanium, a ceramic, and combinations thereof. For example, the first reactor 32 may be packed with zirconia beads and/or alumina beads that are first coated with gamma-alumina.

With continued reference to the FIG. 1, the method 10 also includes, during the first condition 40, contacting 46 the exhaust gas 12 and the non-thermal plasma to thereby oxidize the nitric oxide (NO) to nitrogen dioxide ($NO_2$) and form a first effluent gas 48. The first effluent gas 48 includes nitrogen dioxide ($NO_2$) and may be expellable, dischargable, or conveyable from the first reactor 32 (FIG. 2) though the exhaust conduit 30 (FIG. 2). More specifically, the first effluent gas 48 may be substantially free from nitric oxide (NO) and may be conveyable from the first reactor 32 during the first condition 40.

Without intending to be limited by theory, oxidation of the nitric oxide (NO) to nitrogen dioxide ($NO_2$) within the first reactor 32 may proceed as follows. When sufficient hydrocarbons are present in the exhaust gas 12, which includes water and nitric oxide (NO), the non-thermal plasma-assisted conversion of nitric oxide (NO) may be dominated by oxygen, water, and hydrocarbon components of the exhaust gas 12. Oxygen and hydroxyl radicals may form in the non-thermal plasma and discharge through electron-impact dissociation of oxygen and water. The oxygen and hydroxyl radicals may rapidly react with the hydrocarbons to produce partially-oxidized hydrocarbon radicals. The partially-oxidized hydrocarbon radicals may further react with oxygen to yield peroxyl radicals ($HO_2$), which may then preferentially react with nitric oxide (NO) to form nitrogen dioxide ($NO_2$). As such, the non-thermal plasma may be configured for oxidizing the nitric oxide (NO) to nitrogen dioxide ($NO_2$) during only the first condition 40, as set forth in more detail below.

Referring again to FIG. 1, the method 10 also includes, after contacting 46 the exhaust gas 12 and the non-thermal plasma, conveying 144 the first effluent gas 48 through a second reactor 34 (FIG. 2). The second reactor 34 includes a diesel oxidation catalyst, is disposed adjacent to and in fluid communication with the first reactor 32 (FIG. 2), and is configured for oxidizing the nitric oxide (NO) to nitrogen dioxide ($NO_2$) during only the second condition 42. That is, the second reactor 34 may be disposed downstream of the first reactor 32. Stated differently, the first reactor 32 may be disposed immediately downstream of the internal combustion engine 14 and upstream of the second reactor 34 so that the first reactor 32 is disposed between the internal combustion engine 14 and the second reactor 34. As best shown in FIG. 2, there may be no other reactors disposed between the first reactor 32 and the second reactor 34 along the exhaust conduit 30. As such, the first reactor 32 and the second reactor 34 may be in direct fluid communication with one another.

The diesel oxidation catalyst of the second reactor 34 (FIG. 2) may be any suitable oxidation catalyst configured for oxidizing the nitric oxide (NO) to nitrogen dioxide ($NO_2$) during only the second condition 42. In one non-limiting embodiment, the diesel oxidation catalyst may be a mixture of a plurality of particles of one or more platinum group metals (set forth above) deposited on a high-surface area alumina. The diesel oxidation catalyst may oxidize unburned hydrocarbons, carbon monoxide, and any nitric oxide (NO) present in the first effluent gas 48 or an intermediate effluent gas 52 (FIG. 2), as set forth in more detail below. However, it is to be appreciated that the second reactor 34 may temporarily store the nitrogen dioxide ($NO_2$) during the first condition 40 in which the exhaust gas 12 has the cold-start temperature of less than or equal to about 150° C., i.e., until the exhaust gas 12 has warmed to the operating temperature of greater than about 150° C. Further, the first effluent gas 48 expelled from the first reactor 32 during the first condition 40 may be substantially free from nitric oxide (NO) since the non-thermal plasma of the first reactor 32 may oxidize any nitric oxide (NO) present in the exhaust gas 12 during the first condition 40. Therefore, the first effluent gas 48 may flow through the second reactor 34 for treatment of unburned hydrocarbons and carbon monoxide.

With continued reference to FIG. 1, the method 10 also includes, concurrent to conveying 144, storing 50 the nitrogen dioxide ($NO_2$) within the second reactor 34 (FIG. 2) during only the first condition 40. That is, the nitrogen dioxide ($NO_2$) may be stored within the second reactor 34 while the exhaust gas 12 has the cold-start temperature of less than or equal to about 150° C., i.e., while the exhaust gas 12 is warming after a cold-start of the internal combustion engine 14 (FIG. 2) to the operating temperature. Therefore, the second reactor 32 may store the nitrogen dioxide ($NO_2$) during periods of temporarily- and relatively-low exhaust gas temperature in preparation for further warming of downstream components. That is, the non-thermal plasma only oxidizes the nitric oxide (NO) of the exhaust gas 12 until the exhaust gas 12 has the operating temperature of greater than about 150° C. After the exhaust gas 12 has the operating temperature of greater than about 150° C., as set forth in more detail below, the exhaust gas 12 may flow through the first reactor 32, and the first reactor 32 may not be required for treatment of the exhaust gas 12 until the next cold-start of the internal combustion engine 14.

The method 10 (FIG. 1) also includes, after storing 50 the nitrogen dioxide ($NO_2$), releasing 54 the nitrogen dioxide ($NO_2$) from the second reactor 34 (FIG. 2) during only the second condition 42, i.e., after the exhaust gas 12 has warmed to the operating temperature of greater than about 150° C. That is, once the exhaust gas 12, the first reactor 32, and the second reactor 34 (FIG. 2) have warmed to the operating temperature sufficient for further treatment of the exhaust gas 12 produced by the internal combustion engine 14 (FIG. 1), the nitrogen dioxide ($NO_2$) that is temporarily stored in the second reactor 34 may be released from the second reactor 34. For example, the non-thermal plasma may no longer be generated during the second condition 42, and the second reactor 34 may release the stored nitrogen dioxide ($NO_2$).

The method 10 may further include, during only the first condition 40, contacting 146 the first effluent gas 48 and the diesel oxidation catalyst to thereby form the intermediate effluent gas 52 dischargable from the second reactor 34. That is, during the first condition 40, as the exhaust gas 12 passes through the first reactor 32 (FIG. 2), the non-thermal plasma may oxidize the nitric oxide (NO) to nitrogen dioxide ($NO_2$), as set forth above. Subsequently, as the first effluent gas 48 exits the first reactor 32 and is conveyed through the second reactor 34 (FIG. 2), the nitrogen dioxide ($NO_2$) is stored within the second reactor 34. The diesel oxidation catalyst of the second reactor 34 may also treat any unburned hydrocarbons and/or carbon monoxide, as set forth above. As such, the intermediate effluent gas 52 exiting the second reactor 34 may not include nitrogen dioxide ($NO_2$), or may include comparatively smaller amounts of nitrogen dioxide ($NO_2$) than the first effluent gas 48. For example, the intermediate effluent gas 52 may be substantially free from nitrogen dioxide ($NO_2$).

In addition, referring again to FIGS. 1 and 2, the method 10 may further include reducing 60 nitrogen dioxide ($NO_2$) and nitric oxide (NO) to nitrogen gas ($N_2$). That is, the method 10 may include converting 62 the nitric oxide (NO) and the nitrogen dioxide ($NO_2$) to nitrogen gas ($N_2$), and discharging 64 the nitrogen gas ($N_2$) from the vehicle internal combustion engine 14.

More specifically, as described with reference to FIG. 1, the method 10 may include, during only the first condition 40, conveying 244 the intermediate effluent gas 52 through a third reactor 36 (FIG. 2) that includes a selective catalytic reduction catalyst, is disposed adjacent to and in fluid communication with the second reactor 34, and is configured for reducing the nitrogen dioxide ($NO_2$) and nitric oxide (NO) to nitrogen gas ($N_2$) during only the second condition 42. That is, the third reactor 36 may be disposed downstream of the second reactor 34. Stated differently, the second reactor 34 may be disposed immediately downstream of the first reactor 32 and upstream of the third reactor 36 so that the second reactor 34 is disposed between the first reactor 32 and the third reactor 36 along the path of exhaust conduit 30 between the internal combustion engine 14 and the ambient environment external to the vehicle 16. As best shown in FIG. 2, there may be no other reactors disposed between the second reactor 34 and the third reactor 36 along the exhaust conduit 30. As such, the second reactor 34 and the third reactor 36 may be in direct fluid communication with one another.

Referring again to FIG. 1, the method 10 may further include, concurrent to conveying 244 the intermediate effluent gas 52, storing 150 the nitrogen dioxide ($NO_2$) within the third reactor 36 (FIG. 2) during only the first condition 40. That is, the nitrogen dioxide ($NO_2$) may be stored within the third reactor 36 while the exhaust gas 12 has the cold-start temperature of less than or equal to about 150° C., i.e., while the exhaust gas 12 is warming after a cold-start of the internal combustion engine 14 (FIG. 2) to the operating temperature. Therefore, the third reactor 36 may store the nitrogen dioxide ($NO_2$) during periods of temporarily- and relatively-low exhaust gas temperature in preparation for further warming of downstream components. That is, the non-thermal plasma only oxidizes the nitric oxide (NO) of the exhaust gas 12 until the exhaust gas 12 has the operating temperature of greater than about 150° C. After the exhaust gas 12 has the operating temperature of greater than about 150° C., as set forth in more detail below, the exhaust gas 12 may flow through the first reactor 32 (FIG. 1), and the first reactor 32 may not be required for treatment of the exhaust gas 12 until the next cold-start of the internal combustion engine 14.

The method 10 (FIG. 1) also includes, after storing 150 the nitrogen dioxide ($NO_2$) within the second reactor 34 (FIG. 2) and the third reactor 36 (FIG. 2), releasing 154 the nitrogen dioxide ($NO_2$) from the third reactor 36 during only the second condition 42, i.e., after the exhaust gas 12 has warmed to the operating temperature of greater than about 150° C. That is, once the exhaust gas 12, the first reactor 32 (FIG. 2), the second reactor 34, and the third reactor 36 have warmed to the operating temperature sufficient for further treatment of the exhaust gas 12 produced by the internal combustion engine 14 (FIG. 1), the nitrogen dioxide ($NO_2$) that is temporarily stored in the third reactor 36 may be released from the third reactor 36. For example, the non-thermal plasma may no longer be generated during the second condition 42, and the third reactor 36 may release the stored nitrogen dioxide ($NO_2$).

Referring again to FIG. 2, the vehicle 16 may also include an injector 66 disposed downstream of the second reactor 34 and between the second reactor 34 and the third reactor 36. The injector 66 may be configured for injecting a gas stream, e.g., a second effluent gas 58 set forth in more detail below, with a suitable quantity of a reductant material, such as urea, ammonia, a hydrocarbon-fuel mixture, or an alcohol such as ethanol. For example, urea may be added to the second effluent gas 58 via the injector 66, and may react with the water in the second effluent gas 58 to form ammonia.

The selective catalytic reduction catalyst of the third reactor 36 (FIG. 2) may be selected according to the chosen reductant material. For example, suitable selective catalytic reduction catalysts for use with ammonia as the reductant material include iron-substituted zeolites and copper-substituted zeolites. Zeolites, i.e., porous, crystalline aluminosilicate-based materials, may be modified by ion exchange to include, for example, copper or iron. Alternatively, platinum group metals or other metals such as silver carried as small particles on comparatively larger particles of a ceramic material, such as alumina or titanium dioxide, may also be suitable as the selective catalytic reduction catalyst. In another non-limiting example, the selective catalytic reduction catalyst may include base metals such as vanadium and/or tungsten supported on a plurality of ceramic carrier particles. The selective catalytic reduction catalyst may reduce best when greater than about 50 parts by volume of nitric oxide (NO) based on 100 parts by volume of the exhaust gas 12 leaving the exhaust manifold 28 have been oxidized, for example by the diesel oxidation catalyst of the first reactor 32, to nitrogen dioxide ($NO_2$). Further, the third reactor 36 may generally operate most efficiently when both the diesel oxidation catalyst of the second reactor 34 (FIG. 2) and the selective catalytic reduction catalyst of the third reactor 36 have been warmed to the operating temperature, i.e., to greater than about 150° C. Therefore, rather than allowing non-oxidized and non-reduced nitric oxide (NO) and/or nitrogen dioxide ($NO_2$) to pass through the second reactor 34 and the third reactor 36 during a cold-start of the internal combustion engine 14, i.e., when the exhaust gas 12 has the cold-start temperature of less than or equal to about 150° C., the non-thermal plasma of the first reactor 32 oxidizes the nitric oxide (NO) of the exhaust gas 12 and the resulting nitrogen dioxide ($NO_2$) is stored within the second reactor 34 and the third reactor 36 until the exhaust gas 12 has warmed to the operating temperature.

That is, with continued reference to FIG. 2, on cold-startup of the internal combustion engine 14, the diesel oxidation catalyst and the selective catalytic reduction catalyst within the second reactor 34 and the third reactor 36, respectively, must often be heated from an ambient temperature to the operating temperature by the exhaust gas 12. Since it is desirable to convert most of the carbon monoxide and unburned hydrocarbons in the exhaust gas 12 to carbon dioxide and water, and to convert most of the nitrogen oxides ($NO_x$) to nitrogen gas ($N_2$) during all stages of operation of the internal combustion engine 14, including a period when the reactors 32, 34, 36 are being warmed by the exhaust gas 12 following a cold-start of the internal combustion engine 14, converting the nitric oxide (NO) to nitrogen dioxide ($NO_2$) and storing 50, 150 (FIG. 1) the nitrogen dioxide ($NO_2$) within the second reactor 34 and the third reactor 36 minimizes emission of untreated or unconverted nitric oxide (NO) from the final sections of the exhaust conduit 30 while the diesel oxidation catalyst and selective catalytic reduction catalyst warm to the operating temperature.

As such, referring again to FIG. 1, the method 10 may further include, during only the second condition 42, conveying 44 the exhaust gas 12 through the first reactor 32 (FIG. 2) to form a warmed exhaust gas 56 that includes nitric oxide (NO) and is substantially free from nitrogen dioxide ($NO_2$). That is, during the second condition 42, the non-thermal plasma may not oxidize the nitric oxide (NO) to nitrogen dioxide ($NO_2$), and the warmed exhaust gas 56 discharged from the first reactor 32 may include nitric oxide (NO). The warmed exhaust gas 56 may have the operating temperature of greater than about 150° C., and may be conveyable from the first reactor 32 (FIG. 2) during the second condition 42.

Referring again to FIG. 1, the method 10 may further include, during only the second condition 42, contacting 246 the warmed exhaust gas 56 and the diesel oxidation catalyst to thereby oxidize the nitric oxide (NO) to nitrogen dioxide ($NO_2$) and form the second effluent gas 58. That is, as set forth above, the diesel oxidation catalyst may contact the warmed exhaust gas 56 and oxidize the nitric oxide (NO). As such, the second effluent gas 58 may include nitrogen dioxide ($NO_2$), may include comparatively smaller amounts of nitric oxide (NO) than the warmed exhaust gas 56, and may be conveyable from the second reactor 34 (FIG. 2) to the third reactor 36 (FIG. 2) during the second condition 42. In particular, gradually, the diesel oxidation catalyst may commence oxidation of carbon monoxide, unburned hydrocarbons, and nitric oxide (NO). Therefore, as the second reactor 34 reaches the operating temperature, i.e., greater than about 150° C., the diesel oxidation catalyst of the second reactor 34 may take over the oxidation function of the first reactor 32 (FIG. 2). Further, during the second condition 42, i.e., as soon as the exhaust gas 12 has the operating temperature of greater than about 150° C., the previously-stored nitrogen dioxide ($NO_2$) released from the second reactor 34 (FIG. 2) may combine with the second effluent gas 58 flowing from the now-operative second reactor 34.

In addition, with continued reference to FIG. 1, the method 10 may further include, during only the second condition 42, conveying 344 the second effluent gas 58 through the third reactor 36 (FIG. 2). Therefore, the method 10 may further include contacting 346 the second effluent gas 58 and the selected catalytic reduction catalyst to thereby reduce nitric oxide (NO) and nitrogen dioxide ($NO_2$) to nitrogen gas ($N_2$) and form a third effluent gas 68. That is, once the stored nitrogen dioxide ($NO_2$) has been released from the second reactor 34 (FIG. 2) and the third reactor 36 (FIG. 2) during the second condition 42 (FIG. 1), i.e., once the exhaust gas 12 has the operating temperature of greater than about 150° C., the selective catalytic reduction catalyst may contact the second effluent gas 58 and reduce the nitric oxide (NO) and nitrogen dioxide ($NO_2$). As such, the third effluent gas 68 may be conveyable from the third reactor 36 (FIG. 2) during the second condition 42 and may be substantially free from nitrogen dioxide ($NO_2$), substantially free from nitric oxide (NO), and may include nitrogen gas ($N_2$).

For example, without intended to be limited by theory, the selective catalytic reduction catalyst of the third reactor 36 (FIG. 2) may reduce any nitric oxide (NO) and nitrogen dioxide ($NO_2$) present in the second effluent gas 58 to nitrogen gas ($N_2$). More specifically, the selective catalytic reduction catalyst may reduce nitric oxide (NO) and nitrogen dioxide ($NO_2$) via reaction with ammonia ($NH_3$) to form ammonium nitrite ($NH_4NO_2$), which may then decompose to form nitrogen gas ($N_2$) and water ($H_2O$). Therefore, as set forth above, the method 10 may include reducing 60 the nitric oxide (NO) and the nitrogen dioxide ($NO_2$) to nitrogen gas ($N_2$).

Referring again to FIGS. 1 and 2, the method 10 (FIG. 1) may further include, during only the second condition 42, conveying 444 (FIG. 1) the third effluent gas 68 through a filter 38 (FIG. 2). For example, the vehicle 16 (FIG. 2) may include the filter 38 disposed adjacent to and in fluid communication with the third reactor 36. The filter 38 may be a diesel particulate filter configured for removing particulate matter from the third effluent gas 68 before discharge of the third effluent gas 68 to the atmosphere.

Therefore, the method 10 (FIG. 1) may further include discharging 64 (FIG. 1) the nitrogen gas ($N_2$) from the vehicle internal combustion engine 14 (FIG. 2). Conversely, nitric oxide (NO) and nitrogen dioxide ($NO_2$) may not be discharged from the vehicle internal combustion engine 14 during the first condition 40 (FIG. 1) or during the second condition 42 (FIG. 1). Rather, since the non-thermal plasma oxidizes the nitric oxide (NO) of the exhaust gas 12 and the resulting nitrogen dioxide ($NO_2$) is stored within the second reactor 34 and the third reactor 36 during the first condition 40, nitrogen gas ($N_2$), rather than nitric oxide (NO) and/or nitrogen dioxide ($NO_2$), may be discharged from the internal combustion engine 14.

As best described with reference to FIG. 2, the vehicle 16 therefore includes the internal combustion engine 14, the first reactor 32 disposed adjacent to and in fluid communication with the internal combustion engine 14, and the second reactor disposed adjacent to and in fluid communication with the first reactor 32. Further, the vehicle 16 includes nitrogen dioxide ($NO_2$) stored within the second reactor 34 and the third reactor 36 during only the first condition 40 (FIG. 1); the first effluent gas 48 that is substantially free from nitric oxide (NO), includes nitrogen dioxide ($NO_2$), and is conveyable from the first reactor 32 during the first condition 40 (FIG. 1); and the warmed exhaust gas 56 that includes nitric oxide (NO), is substantially free from nitrogen dioxide ($NO_2$), and is conveyable from the first reactor 32 during the second condition 42 (FIG. 1).

While the best modes for carrying out the disclosure have been described in detail, those familiar with the art to which this disclosure relates will recognize various alternative designs and embodiments for practicing the disclosure within the scope of the appended claims.

The invention claimed is:

1. A method of treating an exhaust gas produced by a vehicle internal combustion engine, the method comprising:
   conveying the exhaust gas through a first reactor that includes a non-thermal plasma and is disposed adjacent to and in fluid communication with the vehicle internal combustion engine, wherein the exhaust gas includes nitric oxide and is transitionable between:
      a first condition in which the exhaust gas has a cold-start temperature that is less than or equal to 150° C.; and
      a second condition in which the exhaust gas has an operating temperature that is greater than 150° C.;
   during the first condition, contacting the exhaust gas and the non-thermal plasma to thereby oxidize the nitric oxide to nitrogen dioxide and form a first effluent gas that includes nitrogen dioxide and is free from nitric oxide;
   conveying the first effluent gas through a second reactor that includes a diesel oxidation catalyst and is disposed adjacent to and in fluid communication with the first reactor;
   concurrent to conveying, storing the nitrogen dioxide within the second reactor during only the first condition; and
   after storing, releasing the nitrogen dioxide from the second reactor during only the second condition.

2. The method of claim 1, further including converting the nitric oxide and the nitrogen dioxide to nitrogen gas, and discharging the nitrogen gas from the vehicle internal combustion engine.

3. The method of claim 1, further including reducing the nitrogen dioxide to nitrogen gas.

4. The method of claim 1, further including, during only the first condition, contacting the first effluent gas and the diesel oxidation catalyst to thereby form an intermediate effluent gas dischargable from the second reactor.

5. The method of claim 4, further including, during only the first condition, conveying the intermediate effluent gas through a third reactor that includes a selective catalytic reduction catalyst and is disposed adjacent to and in fluid communication with the second reactor.

6. The method of claim 5, further including, concurrent to conveying the intermediate effluent gas, storing the nitrogen dioxide within the third reactor during only the first condition.

7. The method of claim 6, further including, after storing the nitrogen dioxide within the third reactor, releasing the nitrogen dioxide from the third reactor during only the second condition.

8. The method of claim 1, further including, during only the second condition, conveying the exhaust gas through the first reactor to form a warmed exhaust gas that includes nitric oxide and is substantially free from nitrogen dioxide.

9. The method of claim 8, further including, during only the second condition, contacting the warmed exhaust gas and the diesel oxidation catalyst to thereby oxidize the nitric oxide to nitrogen dioxide and form a second effluent gas.

10. The method of claim 9, further including, during only the second condition, conveying the second effluent gas through a third reactor that includes a selective catalytic reduction catalyst and is disposed adjacent to and in fluid communication with the second reactor.

11. The method of claim 10, further including, during only the second condition, contacting the second effluent gas and the selective catalytic reduction catalyst to thereby reduce the nitric oxide and the nitrogen dioxide to nitrogen gas and form a third effluent gas.

12. The method of claim 11, further including, during only the second condition, conveying the third effluent gas through a filter disposed adjacent to and in fluid communication with the third reactor.

13. A method of treating an exhaust gas produced by a vehicle internal combustion engine, the method comprising:
conveying the exhaust gas through a first reactor that includes a non-thermal plasma and is disposed adjacent to and in fluid communication with the vehicle internal combustion engine, wherein the exhaust gas includes nitric oxide and is transitionable between:
a first condition in which the exhaust gas has a cold-start temperature that is less than or equal to 150° C.; and
a second condition in which the exhaust gas has an operating temperature that is greater than 150° C.;
during the first condition, contacting the exhaust gas and the non-thermal plasma to thereby oxidize the nitric oxide to nitrogen dioxide and form a first effluent gas that includes nitrogen dioxide and is free from nitric oxide;
conveying the first effluent gas through a second reactor that includes a diesel oxidation catalyst and is disposed adjacent to and in fluid communication with the first reactor;
concurrent to conveying, storing the nitrogen dioxide within the second reactor during only the first condition;
concurrent to conveying, contacting the first effluent gas and the diesel oxidation catalyst to thereby form an intermediate effluent gas;
conveying the intermediate effluent gas through a third reactor that includes a selective catalytic reduction catalyst and is disposed adjacent to and in fluid communication with the second reactor;
concurrent to conveying the intermediate effluent gas, storing the nitrogen dioxide within the third reactor during only the first condition;
after storing the nitrogen dioxide within the second reactor and the third reactor, releasing the nitrogen dioxide from the second reactor and the third reactor during only the second condition;
reducing the nitric oxide and nitrogen dioxide to nitrogen gas; and
discharging the nitrogen gas from the vehicle internal combustion engine.

14. The method of claim 13, further including, during only the second condition, conveying the exhaust gas through the first reactor to form a warmed exhaust gas that includes nitric oxide and is substantially free from nitrogen dioxide.

15. A vehicle comprising:
an internal combustion engine configured for producing an exhaust gas during operation, wherein the exhaust gas includes nitric oxide and is transitionable between:
a first condition in which the exhaust gas has a cold-start temperature of less than or equal to 150° C.; and
a second condition in which the exhaust gas has an operating temperature that is greater than 150° C.;
a first reactor disposed adjacent to and in fluid communication with the internal combustion engine, wherein the first reactor includes a non-thermal plasma and is configured for oxidizing the nitric oxide to nitrogen dioxide during only the first condition;
a first effluent gas that is free from nitric oxide, includes nitrogen dioxide, and is conveyable from the first reactor during the first condition;
a warmed exhaust gas that includes nitric oxide, is substantially free from nitrogen dioxide, and is conveyable from the first reactor during the second condition;
a second reactor disposed adjacent to and in fluid communication with the first reactor, wherein the second reactor includes a diesel oxidation catalyst and is configured for oxidizing the nitric oxide to nitrogen dioxide during only the second condition; and
nitrogen dioxide stored within the second reactor during only the first condition.

16. The vehicle of claim 15, further including a second effluent gas that is conveyable from the second reactor during the second condition and includes nitrogen dioxide.

17. The vehicle of claim 16, further including a third reactor disposed adjacent to and in fluid communication with the second reactor, wherein the third reactor includes a selective catalytic reduction catalyst and is configured for reducing nitric oxide and nitrogen dioxide to nitrogen gas during only the second condition.

18. The vehicle of claim 17, further including a third effluent gas that is conveyable from the third reactor during the second condition and is substantially free from nitric oxide and nitrogen dioxide.

19. The vehicle of claim 18, further including a filter disposed adjacent to and in fluid communication with the third reactor.

20. The vehicle of claim 15, wherein the first reactor is disposed downstream of the internal combustion engine and upstream of the second reactor so that the first reactor is disposed between the internal combustion engine and the second reactor.

* * * * *